US00RE35689E

United States Patent [19]

Kulish

[11] E Patent Number: Re. 35,689

[45] Reissued Date of Patent: Dec. 16, 1997

[54] APPARATUS FOR MAGNETIC TREATMENT OF LIQUIDS

[76] Inventor: Peter A. Kulish, Box 1000, Gardenville, Pa. 18926

[21] Appl. No.: 661,805

[22] Filed: Jun. 11, 1996

Related U.S. Patent Documents

Reissue of:

[64] Patent No.: 4,605,498
Issued: Aug. 12, 1986
Appl. No.: 597,549
Filed: Apr. 6, 1984

U.S. Applications:

[63] Continuation of Ser. No. 725,908, Jul. 3, 1991, abandoned, which is a continuation of Ser. No. 382,306, Jul. 19, 1989, abandoned, which is a continuation of Ser. No. 231,455, Aug. 12, 1988, abandoned.

[51] Int. Cl.[6] ..... B01D 35/06

[52] U.S. Cl. ..... 210/222; 210/232; 210/695

[58] Field of Search ..... 210/222, 223, 210/232, 695; 55/DIG. 6; 96/1, 2

[56] References Cited

U.S. PATENT DOCUMENTS

| | | | |
|---|---|---|---|
| D. 175,814 | 10/1955 | Wells | D91/3 |
| D. 241,936 | 10/1976 | Rosaen | D23/1 |
| D. 242,920 | 1/1977 | Csurgay | D23/3 |
| D. 253,841 | 1/1980 | Sanderson | D23/3 |
| D. 262,306 | 12/1981 | Carpenter | D23/3 |
| D. 262,987 | 2/1982 | Carpenter | D23/3 |
| D. 277,775 | 2/1985 | Moran et al. | D23/3 |
| D. 279,027 | 5/1985 | Weisenbarger et al. | D23/3 |
| 1,528,119 | 3/1925 | Ludwig . | |
| 2,612,268 | 9/1952 | Merwin | 210/222 |
| 2,652,925 | 9/1953 | Vermeiren | 210/222 |
| 2,939,830 | 6/1960 | Green et al. | 210/222 |
| 3,059,910 | 10/1962 | Moriya | 210/695 |
| 3,228,878 | 1/1966 | Moody | 210/222 |
| 3,349,354 | 10/1967 | Miyata | 210/222 |
| 3,463,729 | 8/1969 | Bean | 210/695 |
| 4,146,479 | 3/1979 | Brown | 210/222 |
| 4,153,559 | 5/1979 | Sanderson | 210/222 |
| 4,210,535 | 7/1980 | Risk | 210/222 |
| 4,344,593 | 8/1982 | Canto | 248/73 |
| 4,367,143 | 1/1983 | Carpenter | 210/222 |
| 4,372,852 | 2/1983 | Kovacs | 210/222 |
| 4,572,145 | 2/1986 | Mitchell et al. | 210/222 |

FOREIGN PATENT DOCUMENTS

| | | |
|---|---|---|
| 228518 | 10/1959 | Australia . |
| 1963700 | 6/1971 | Germany . |
| 1189888 | 4/1970 | United Kingdom . |

OTHER PUBLICATIONS

*The Magnetic Blueprint of Life* by Albert Roy Davis and Walter C. Rawls, Jr., Exposition Press, p. 89, 1979.

Specification Sheet of *Ceramic Permanent Magnets* of Allen–Bradley, Publication 2020–070–Apr., 1974.

*Magnetic Treatment of Water,* Sponsored by Advanced Research Projects Agency, ARPA Order No. 1622–4, Jan. 30, 1973.

(List continued on next page.)

*Primary Examiner*—John Kim
*Attorney, Agent, or Firm*—Dann, Dorfman, Herrell and Skillman, P.C.

[57] ABSTRACT

A method and apparatus is disclosed for magnetic treatment of liquids by concentrating primarily south pole magnetic fields on the liquids to provide descaling and deliming properties thereto.

One embodiment of the invention generally comprises a cylindrical casing of molded plastic or the like for surrounding a pipe through which a liquid is passed. The casing includes plural magnets arranged around the periphery of the pipe in such a manner that their north poles are directed radially outwardly from the central axis of the pipe and their south poles are directed radially inwardly toward the central axis in order to concentrate the south pole magnetic fields more strongly upon the fluid. In an alternate embodiment, the orientation of the poles has been reversed such that the liquid is subjected to predominantly north pole magnetic fields.

26 Claims, 3 Drawing Sheets

OTHER PUBLICATIONS

*A Brief History of Magnetic Water Conditioning,* U.S. Department of Commerce, 1973, pp. 1 and 2.
*On the Magnetic Treatment of Feed Water for Steam Boilers* by N. Todorivev and M. Yovchev, U.S. Department of Commerce FTD–HC–23–1641–72 (undated).
*A Magnetic 'Believe It Or Not',* Sep. 6, 1980.
*Continuation of U.S. Dept. of Commerce Tests & Studies* (undated).

*Magnetic Treatment of Water,* Vera Belova, 1972.

*An Introduction to the Magenteic Treatment of Water* an interview between Dr. Bruce DePalma and Mr. Coke (undated).

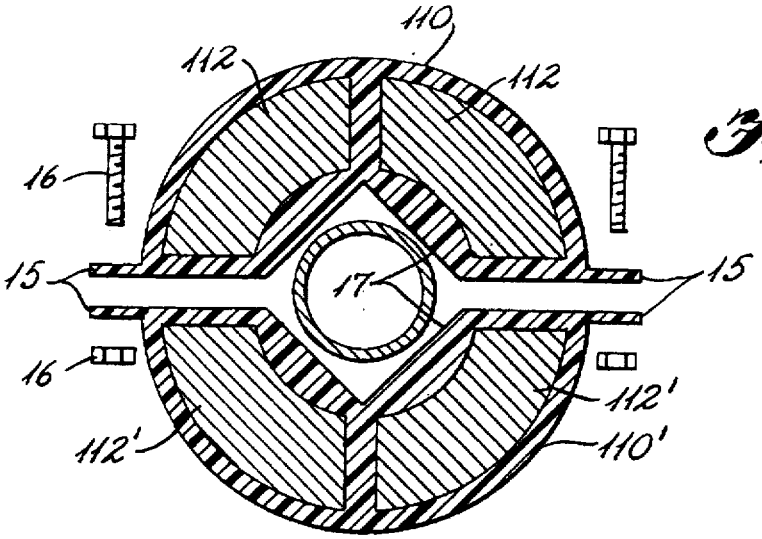
Fig. 5
Fig. 6
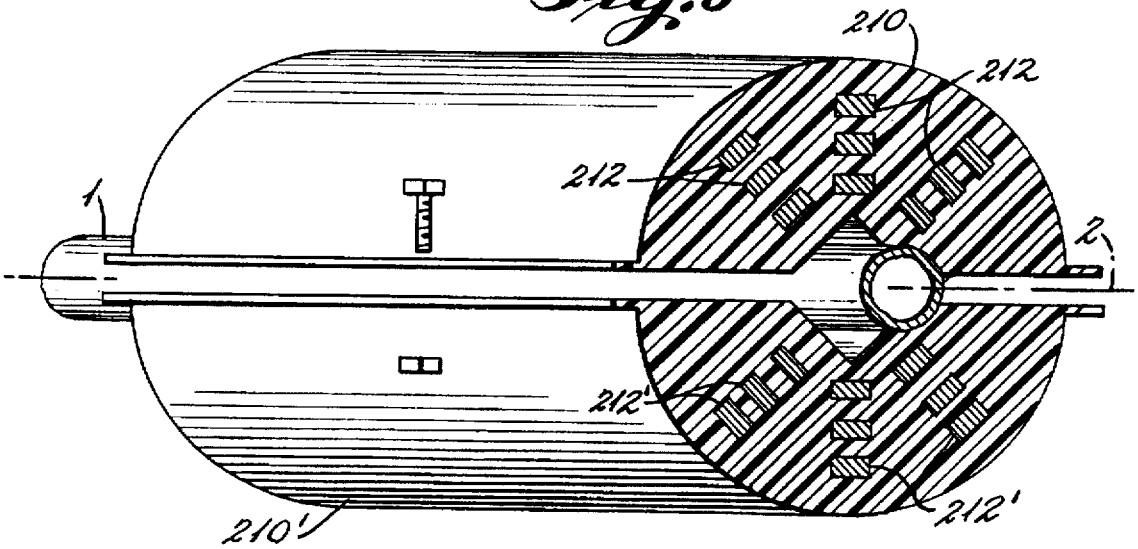
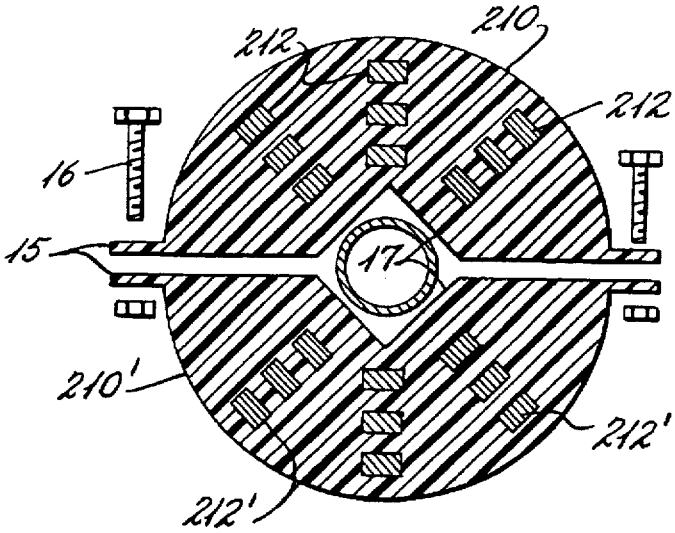
Fig. 7

APPARATUS FOR MAGNETIC TREATMENT OF LIQUIDS

Matter enclosed in heavy brackets [ ] appears in the original patent but forms no part of this reissue specification; matter printed in italics indicates the additions made by reissue.

*This application is a continuation of continuation reissue Application No. 07/725,908 filed Jul. 3, 1991, now abandoned, which is a continuation of continuation reissue Application No. 07/382,306, filed on Jul. 19, 1989, now abandoned, which in turn is a continuation of reissue Application No. 07/231,455 filed on Aug. 12, 1988, now abandoned, which is a reissue Application No. 06/597,549 filed on Apr. 6, 1984, issued U.S. Pat. No. 4,605,498 dated Aug. 12, 1986.*

CROSS-REFERENCES TO PRIOR ART

Great Britain No. 1,189,888—Chemolimpex Magyar Vegyiaru Kulkereskedelmi Vallalat, METHOD AND APPARATUS FOR THE TREATMENT OF FLUIDS OR SOLUTIONS BY ELECTRIC FIELDS U.S. Pat. No. 2,652,925—T. I. S. Vermeiren, MAGNETIC TREATMENT DEVICE FOR LIQUIDS U.S. Pat. No. 2,939,830—W. G. Green, et al., WATER CONDITIONER U.S. Pat. No. 3,228,818—D. L. Moody, METHOD AND APPARATUS FOR TREATMENT OF FLOWING LIQUIDS TO CONTROL DEPOSITION OF SOLID MATTER THEREFROM U.S. Pat. No. 4,146,479—Merritt J. Brown, MAGNETIC WATER CONDITIONER U.S. Pat. No. 4,153,559—Charles H. Sanderson, WATER TREATMENT DEVICE AND METHOD FOR MANUFACTURING SAME U.S. Pat. No. 4,210,535—George Risk, MAGNETIC TREATMENT DEVICES FOR WATER PIPELINES

BACKGROUND AND SUMMARY OF THE INVENTION

This invention relates to a method and apparatus for magnetic treatment of fluids, particularly liquids.

A considerable amount of study and development has been conducted over the last 35 years or so, indicating empirically that magnetically treated liquids, such as water, contribute effectively to the prevention, loosening, and removal of crust and scale from the inner surfaces of metal conduits, tanks, sewage systems, and the like. It has been found that exposure of liquids to predominantly south pole magnetic fields are particularly effective in reducing crust and scale buildup on conduit walls. Prior art devices for accomplishing this liquid treatment have used horseshoe and bar magnets or the like in which both the north and south poles of the magnets are adjacent the pipe through which the fluids flow such that one of the magnetic pole energies are predominant on the upstream side of the device and the other magnetic pole energies are predominant on the downstream side of the device. The above-referenced U.S. Pat. No. 2,652,925 to Vermeiren discloses ring- or donut-shaped magnets arranged around a pipe through which a liquid flows with one pole of each magnet on the upstream side of the device and the opposite pole on the downstream side of the device.

It is an object of the instant invention to magnetically treat liquids in a more efficient and economical manner than has been done previously.

It is a further object of the invention to magnetically treat liquids by exposing them to a predominantly south pole oriented field in order to impart properties to the liquid which effectively contribute to descaling and the like.

It is a further object of the invention to magnetically treat potable liquids, such as wines, by passing them through magnetically oriented fields which are either predominantly north pole or predominantly south pole fields for the purpose of changing the taste of the liquid.

One embodiment of the instant invention generally comprises a cylindrical casing of molded plastic or the like for surrounding a pipe through which a liquid is passed. The casing includes plural magnets arranged around the periphery of the pipe in such a manner that their north poles are directed radially outwardly from the central axis of the pipe and their south poles are directed radially inwardly toward the central axis in order to concentrate the south pole magnetic fields more strongly upon the fluid. In an alternate embodiment, the orientation of the poles has been reversed such that the liquid is subjected to predominantly north pole magnetic fields.

BRIEF DESCRIPTION OF THE DRAWINGS

FIG. 5 is a cross-sectional view of the device of FIG. 4.

FIG. 6 is an isometric view of another embodiment of the instant invention.

FIG. 7 is a cross-sectional view of the embodiment of FIG. 6.

DETAILED DESCRIPTION OF THE INVENTION

Throughout the various drawings, like numbers have been used for like functional members.

Figure 1:
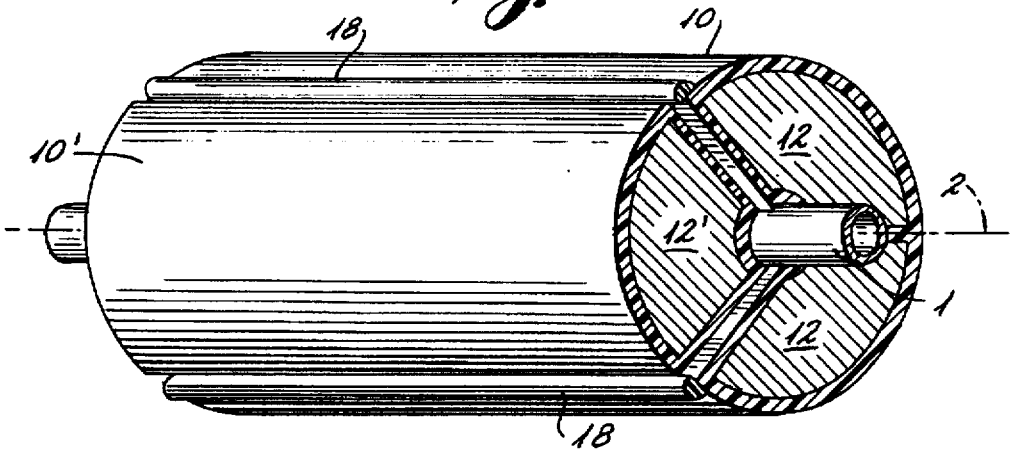
FIG. 1 is an isometric view of one embodiment of the instant invention.
Figure 2:
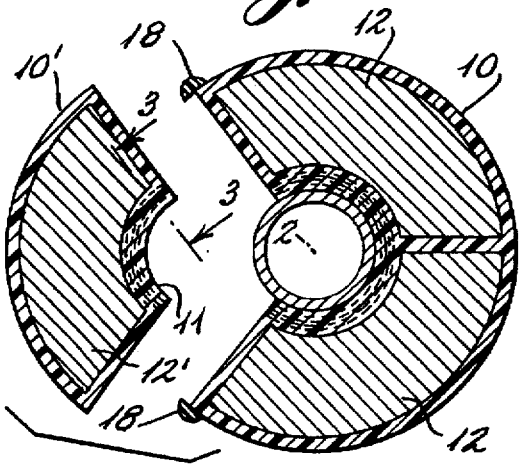
FIG. 2 is a cross-sectional view of the device of FIG. 1, with a section of the device removed from the pipe to illustrate the manner of connection thereto.
Figure 3:
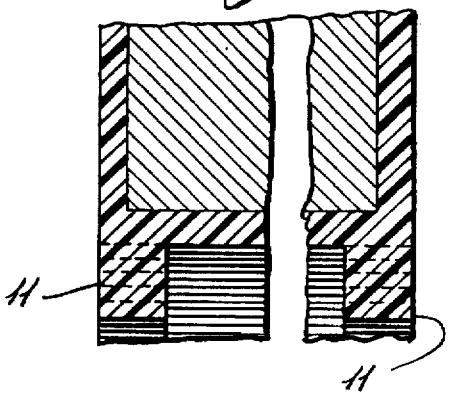
FIG. 3 is a partial cross-sectional view, along the lines 3—3 of FIG. 2, illustrating perforated tabs for adaptation of the device to pipes of different diameters.

Referring to FIGS. 1–3, a casing is comprised of sections 10, 10' in which are encased arcuate sector magnets 12, 12'. The casing is preferably formed of a molded plastic, such as polyvinylchloride (PVC), and the arcuate sector magnets are magnetically oriented in a radial direction with the south magnetic pole located at the internal radius thereof and the north pole located at the external radius thereof. As best seen in FIG. 2, the major section 10 of the device surrounds substantially 270° of the circumference of the pipe 1 with the cooperating section 10' attachable, by a snap fit with lips 18, to totally surround the pipe 1.

Perforated end tabs 11 are provided, as best seen in FIG. 3, with portions of tabs 11 removable along the lines of perforation to adapt the device to pipes of various diameters.

Figure 4:
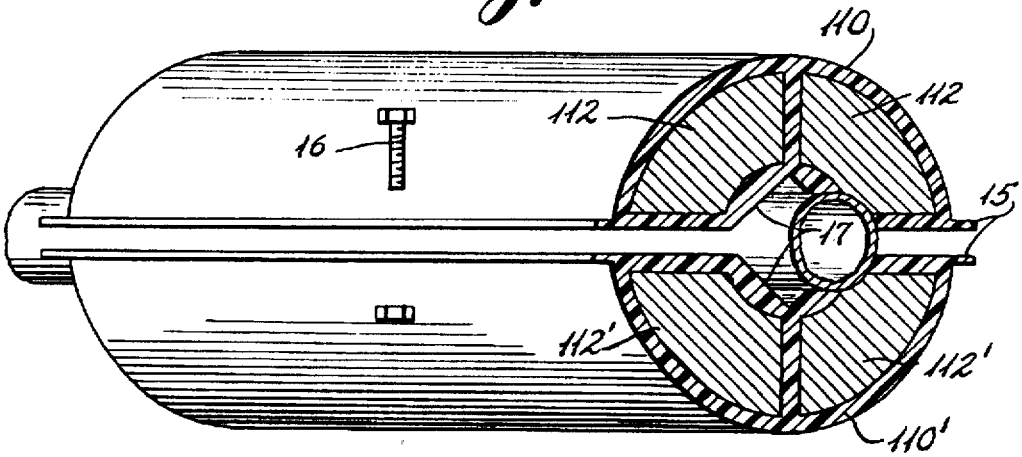
FIG. 4 is an isometric view of an alternative embodiment of the instant invention.

Referring to FIGS. 4 and 5, generally hemispherical casing sections 110, 110' are used in much the same way as the embodiment of FIGS. 1–3. However, flanges 15 and nut and bolts 16 are provided for connecting the two sections 110 and 110' together, and generally V-shaped pipe engaging portions 17 are provided in order that the sections may be mounted on pipes of varying diameters.

FIGS. 6 and 7 illustrate an alternative embodiment in which sections 210, 210' encase bar magnets 212, 212' having their longitudinal axes generally parallel to the central axis 2 of pipe 1. Each bar magnet is magnetically and physically oriented such that the south pole magnetic fields are directed radially inward toward central axis 2 and the north pole magnetic fields are directed generally radially outwardly from central axis 2. By radially stacking bar magnets 212, 212', as illustrated in FIGS. 6 and 7, the magnetic fields are increased in a cumulative manner. According to the magnetic strength of each bar magnet, each radial stack may comprise one or more magnets. Although FIGS. 6 and 7 illustrate the bar magnets as being separated by the plastic casing material, it is contemplated that the magnets of a stack may be in physical contact with each other.

Figure 8:
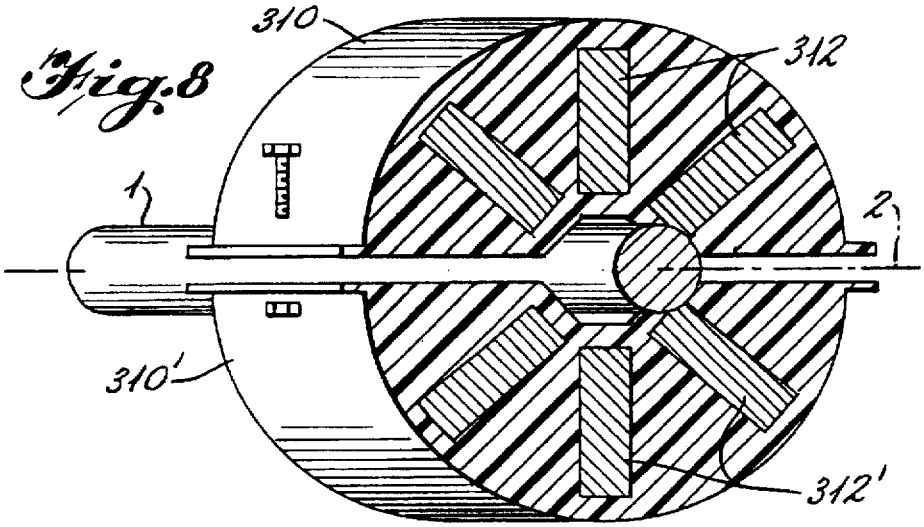
FIG. 8 is an isometric view of still another embodiment of the instant invention.

In the additional embodiment of FIG. 8, sections 310, 310' have bar magnets 312, 312' contained therein such that the longitudinal axes of bar magnets 312, 312' are perpendicular to central axis 2. Bar magnets 312, 312' are also magnetically and physically oriented such that the south pole magnetic fields are directed radially inwardly and the north pole magnetic fields are directed radially outwardly.

Figure 9:
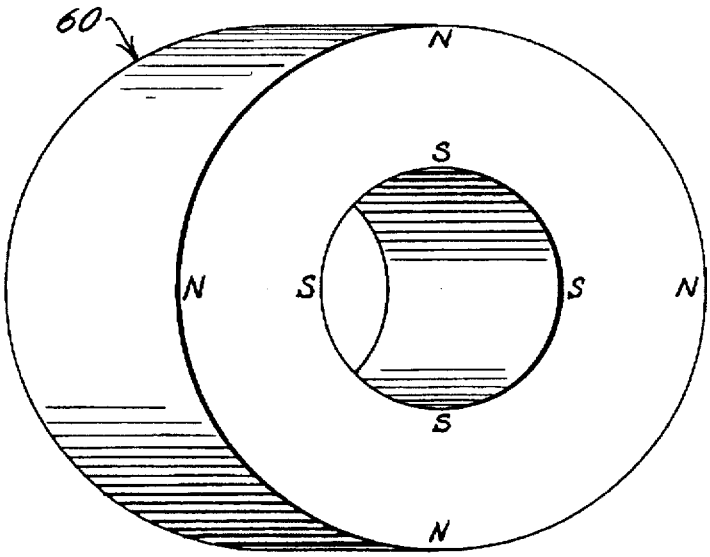
FIGS. 9 and 10 are isometric views for illustration of additional alternate embodiments of the instant invention.
Figure 10:
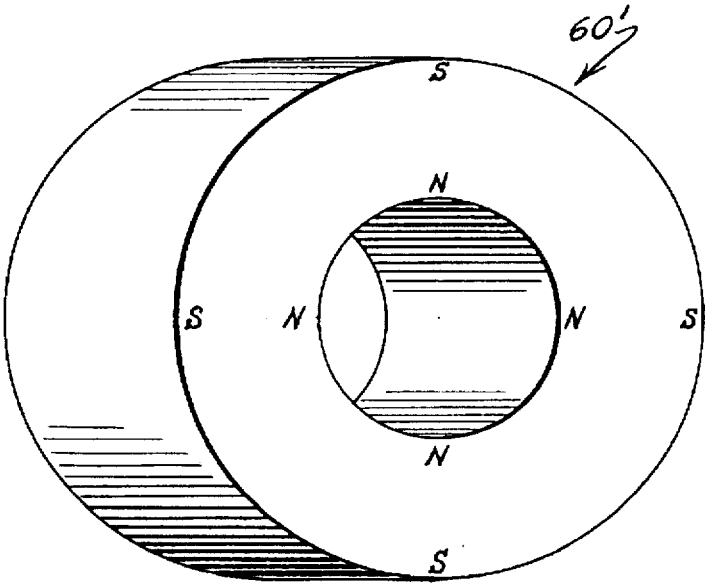

FIGS. 9 and 10 disclose generally cylindrical or donut-shaped magnets 60, 60' having one pole at the outer periphery thereof and the opposite pole at the inner periphery thereof. In FIG. 9, the south pole is disposed at the inner periphery and the north pole is disposed at the outer periphery. Cylindrical magnet 60', of FIG. 10, discloses the south pole at the outer periphery thereof and the north pole at the inner periphery thereof. It has been found empirically that magnets 60, 60' noticeably change the taste of liquids passed through the centers thereof, with the preference for the taste depending upon the individual taster. Although disclosed as a unitary magnet in FIGS. 9 and 10, it is contemplated that these magnets 60, 60' could be sectional, as illustrated in the earlier embodiments.

Arcuate sector magnets illustrated in several of the embodiments are readily available as ceramic permanent magents of specified strengths, ranging from M1–M8, such as those produced by the Magnetics Division of ALLEN-BRADLEY of Milwaukee, Wis. Other types of magnets which may be used include those commonly referred to as alnico (a combination of aluminum, nickel, and cobalt), as well as cerium magnets. The bar magnets may also be alnico, cerium, or ceramic ferrite.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense. Various modifications may be incorporated in the structure without departing from the scope of the invention, namely, the casing may be provided with pockets into which the magnets may be received.

It is also to be understood that the following claims are intended to cover all of the generic and specific features of the invention herein described and all statements of the scope of the invention which, as a matter of language, might be said to fall therebetween.

What is claimed as new and desired to be secured by letters patent is:

1. An apparatus for magnetic treatment of potable liquids, and comprising:

magnetic means for providing north and south magnetic fields and concentrating predominantly only one of said magnetic fields on a central axis to provide magnetic treatment of a liquid located generally along said central axis and substantially within said one magnetic field; and a casing surrounding said magnetic means for holding said magnetic means onto a conduit through which said liquid flows, said casing defining an internal diameter means for mating with different diameters of said conduit according to removal of portions of said internal diameter means.

2. An apparatus as in claim 1, wherein said magnetic means comprises:

plural bar magnets arranged about said central axis, each of said bar magnets having a north pole and a south pole with said south pole directed generally radially toward said central axis and said north pole directed generally away from said central axis.

3. An apparatus as in claim 1, wherein said magnetic means comprises:

plural magnets each in the form of arcuate sectors having an internal radius and an external radius and being magnetically oriented radially to provide a south pole at said internal radius and a north pole at said external radius;

said magnets arranged about said central axis with said south poles directed inwardly toward said axis and said north poles directed outwardly from said axis.

4. An apparatus as in claim 1, wherein said magnetic means comprises:

a cylindrical magnet having an internal and an external diameter and a cylinder axis, a magnetic pole at one of said diameters and an opposing magnetic pole at the other of said diameters, said cylinder axis being centered generally upon said central axis.

5. An apparatus as in claim 4, wherein said cylindrical magnet comprises:

a south pole at said internal diameter and a north pole at said external diameter.

6. An apparatus as in claim 4, wherein said cylindrical magnet comprises:

a north pole at said internal diameter and a south pole at said external diameter.

7. An apparatus as in claim 1, wherein said magnetic means comprises:

plural bar magnets arranged about said central axis, each of said bar magnets having a longitudinal axis substantially parallel to said central axis, and north and south magnetic poles substantially perpendicular to said central axis, one of said poles directed generally toward said central axis, and the other of said poles directed generally away from said central axis.

8. An apparatus as in claim 7, wherein said south pole of each of said bar magnets is directed generally toward said central axis.

9. An apparatus as in claim 1, and comprising:

said casing being subdivided to provide a main portion and a segment portion and having means to snap fit said segment portion to said main portion to accomplish said attaching.

*10. Apparatus for the magnetic treatment of a liquid flowing through a conduit comprising:*

*(a) magnetic means providing north and south magnetic fields, said magnetic means including at least two magnets, each magnet having a north pole and a south pole;*

*(b) a support for supporting said magnets externally of the conduit in a selected orientation so that each of the magnets included in the entire device has only the same pole oriented toward the conduit and has the other pole oriented only away from the conduit to enable only one of the magnetic fields to be generally directed by each of the magnets into the conduit and to enable the other magnetic field to be generally directed by each of the magnets only away from the conduit;*

*(c) a conduit engaging portion having at least a pair of conduit engaging surfaces oriented at an angle relative to one another to permit the apparatus to be mounted on the conduit, one magnet being supported relative to the support with a selected pole located along a corresponding one of the conduit engaging surfaces for positioning toward the conduit and the other magnet being supported relative to the support with the same selected pole located along the other corresponding conduit engaging surface for positioning toward the conduit; and*

*(d) connecting means for removably mounting said support and magnets onto the conduit so that the liquid in the conduit is exposed only to predominately the one magnetic field directed into the conduit by each of the magnets.*

*11. Apparatus for the magnetic treatment of a liquid flowing through a conduit having a central axis comprising:*

*(a) magnetic means providing north and south magnetic fields, said magnetic means including at least two magnets, each magnet having a north pole and a south pole;*

*(b) a support for supporting said magnets externally of the conduit in a selected orientation so that each of the magnets included in the entire device has only the same pole oriented toward the conduit and has the other pole oriented only away from the conduit to enable only one of the magnetic fields to be generally directed by each of the magnets into the conduit and to enable the other magnetic field to be generally directed by each of the magnets only away from the conduit;*

*(c) a conduit engaging portion having at least a pair of conduit engaging surfaces oriented at an angle relative to one another to permit the apparatus to be mounted on conduits of varying diameters, one magnet being supported relative to the support with a selected pole located along a corresponding one of the conduit engaging surfaces for positioning toward the conduit and the other magnet being supported relative to the support with the same selected pole located along the other corresponding conduit engaging surface for positioning toward the conduit; and*

*(d) connecting means for removably mounting said support and magnets onto the conduit in position for concentrating predominantly only the one of the magnetic fields on the central axis of the conduit to provide magnetic treatment of the liquid generally along the central axis of the conduit and substantially within the one magnetic field.*

*12. The apparatus in accordance with claim 10 or 11 wherein said magnets are affixed to said support and wherein said connecting means comprises mounting flanges on said support and a connecting fastener cooperating with the mounting flanges of the support to permit the support and the magnets to be removably mounted onto the conduit.*

*13. The apparatus in accordance with claim 12 wherein the pole located along the corresponding conduit engaging surfaces is the south pole.*

*14. The apparatus in accordance with claim 12 wherein said magnets include bar magnets each having a longitudinal axis oriented generally parallel to a central axis of said conduit.*

*15. The apparatus in accordance with claim 10 or 11 comprising a second support removably mountable together with the other support around the conduit wherein each of said supports provides at least a pair of the conduit engaging surfaces oriented at an angle relative to one another to permit the apparatus to be mounted on the conduit, and wherein said magnetic means comprises at least two magnets supported on each support, each magnet having a north pole and a south pole, one magnet on each support being supported with a selected pole located along a corresponding one of the conduit engaging surfaces of such support for positioning toward the conduit and the other magnet on each support being supported with the same selected pole located along the other corresponding conduit engaging surface of such support for positioning toward the conduit so that each of the magnets included in the entire device has only said same pole oriented toward the conduit and has said other pole only oriented away from the conduit so that the one magnetic field is generally directed into the conduit by each of the magnets.*

*16. The apparatus in accordance with claim 15 wherein the pole located along the corresponding conduit engaging surfaces of each support is the south pole.*

*17. The apparatus in accordance with claim 15 wherein said magnets are affixed to the respective supports, and wherein said connecting means comprises mounting flanges on each of said supports, the mounting flanges of each support cooperating with the mounting flanges of the other support to permit the supports and the magnets to be removably mounted together around the conduit.*

*18. The apparatus in accordance with claim 17 wherein the pole located along the corresponding conduit engaging surfaces of each support is the south pole.*

*19. The apparatus in accordance with claim 17 wherein said magnets include bar magnets each having a longitudinal axis oriented generally parallel to a central axis of said conduit.*

*20. Apparatus for the magnetic treatment of a liquid flowing through a conduit comprising:*

*(a) magnetic means including at least one magnet having a north pole and a south pole for respectively providing north and south magnetic fields;*

*(b) a one-piece support member for supporting said magnet externally of the conduit wherein said magnet is affixed to said support member so that one pole can be located toward the conduit and the other pole can be located away from the conduit such that each magnet included in the entire device has only the same pole oriented toward the conduit and has the other pole oriented only away from said conduit to enable only one of the magnetic fields to be generally directed by each magnet into the conduit and to enable the other magnetic field to be generally directed by each magnet only away from the conduit; and*

*(c) connecting means for removably mounting said support member and said magnet onto the conduit so that*

*the liquid in the conduit is exposed only to predominately the one magnetic field directed into the conduit, wherein said connecting means comprises mounting flanges on said one-piece support member, each flange having an opening, and a connecting fastener cooperating with the openings on the mounting flanges of the support member to permit the support member and the magnet to be removably mounted onto the conduit.*

*21. Apparatus for the magnetic treatment of a liquid flowing through a conduit having a central axis comprising:*

*(a) magnetic means including at least one magnet having a north pole and a south pole for respectively providing north and south magnetic fields;*

*(b) a one-piece support member for supporting said magnet externally of the conduit wherein said magnet is affixed to said support member so that one pole is located toward the conduit and the other pole is located away from the conduit such that each magnet included in the entire device has only the same pole oriented toward the conduit and has the other pole oriented only away from said conduit to enable only one of the magnetic fields to be generally directed by each magnet of the device into the conduit and to enable the other magnetic field to be generally directed by each magnet of the device only away from the conduit; and*

*(c) connecting means for removably mounting said support member and said magnet onto the conduit in position for concentrating predominantly only the one of the magnetic fields on the central axis of the conduit to provide magnetic treatment of the liquid generally along the central axis of the conduit and substantially within the one magnetic field, wherein said connecting means comprises mounting flanges on said one-piece support member, each flange having an opening, and a connecting fastener cooperating with the openings of the mounting flanges of the support member to permit the support member and the magnet to be removably mounted onto the conduit.*

*22. The apparatus in accordance with claim 20 or 21 wherein the pole located toward the conduit is the south pole.*

*23. The apparatus in accordance with claims 20 or 21 wherein said connecting fastener is adjustably releasable to permit said apparatus to be moved along said conduit after being mounted in position to said conduit.*

*24. The apparatus in accordance with claim 20 or 21 comprising a second one-piece support member removably mountable together with the other support member around the conduit and wherein said magnetic means comprises at least one magnet having a north pole and a south pole affixed to each of said support members in a selected orientation so that each magnet included in the entire device has only the same pole oriented toward the conduit and has the other pole oriented only away from said conduit and wherein said connecting means comprises mounting flanges on each of said support members, each of the mounting flanges having an opening, the openings of the mounting flanges of each support member cooperating with the openings of the mounting flanges of the other support member to permit the support members and the magnets to be removably mounted around the conduit by said connecting fastener.*

*25. The apparatus in accordance with claim 24 wherein the pole of each magnet located toward the conduit is the south pole.*

*26. The apparatus in accordance with claim 24 wherein said connecting fastener is adjustably releasable to permit said apparatus to be moved along said conduit after being mounted in position to said conduit.*

* * * * *